(12) United States Patent
Liu et al.

(10) Patent No.: US 11,510,225 B2
(45) Date of Patent: Nov. 22, 2022

(54) METHODS, TERMINAL DEVICE AND BASE STATION FOR PHYSICAL DOWNLINK CONTROL CHANNEL MONITORING

(71) Applicant: Telefonaktiebolaget LM Ericsson (publ), Stockholm (SE)

(72) Inventors: Jinhua Liu, Beijing (CN); Gen Li, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 92 days.

(21) Appl. No.: 17/051,388

(22) PCT Filed: May 10, 2019

(86) PCT No.: PCT/CN2019/086470
§ 371 (c)(1),
(2) Date: Oct. 28, 2020

(87) PCT Pub. No.: WO2019/214734
PCT Pub. Date: Nov. 14, 2019

(65) Prior Publication Data
US 2021/0051686 A1     Feb. 18, 2021

(30) Foreign Application Priority Data
May 11, 2018  (WO) ................ PCT/CN2018/086580

(51) Int. Cl.
*H04W 72/12*     (2009.01)
*H04W 76/27*     (2018.01)
(Continued)

(52) U.S. Cl.
CPC ....... *H04W 72/1257* (2013.01); *H04L 1/1614* (2013.01); *H04W 24/08* (2013.01);
(Continued)

(58) Field of Classification Search
CPC ......... H04W 72/1257; H04W 72/0493; H04W 72/0446; H04W 72/0453; H04W 24/08;
(Continued)

(56) References Cited

U.S. PATENT DOCUMENTS

2015/0146643 A1   5/2015  Fu et al.
2019/0313437 A1*  10/2019 Jung .................... H04W 74/006
2020/0245395 A1*  7/2020  Zhang .................. H04L 5/0053

FOREIGN PATENT DOCUMENTS

CN    107659994 A    2/2018
CN    107949064 A    4/2018
(Continued)

OTHER PUBLICATIONS

International Search Report dated Aug. 12, 2019 for International Application No. PCT/CN2019/086470 filed on May 10, 2019, consisting of 6-pages.
(Continued)

*Primary Examiner* — Samina F Choudhry
(74) *Attorney, Agent, or Firm* — Christopher & Weisberg, P.A.

(57) ABSTRACT

Methods, a terminal device and a base station are disclosed for physical downlink control channel (PDCCH) monitoring. According to an embodiment, a terminal device receives a downlink assignment for assigning physical downlink shared channel (PDSCH) resource to the terminal device. The terminal device determines at least part of control resource set (CORESET) resource that overlaps with the assigned PDSCH resource. The terminal device skips PDCCH monitoring for the determined at least part of the CORESET resource.

13 Claims, 13 Drawing Sheets

(51) Int. Cl.
    *H04L 1/16*     (2006.01)
    *H04W 24/08*     (2009.01)
    *H04W 72/04*     (2009.01)

(52) U.S. Cl.
    CPC ..... *H04W 72/042* (2013.01); *H04W 72/0446* (2013.01); *H04W 72/0453* (2013.01); *H04W 72/0493* (2013.01); *H04W 76/27* (2018.02)

(58) Field of Classification Search
    CPC .... H04W 76/27; H04W 72/042; H04L 1/1614
    See application file for complete search history.

(56) References Cited

FOREIGN PATENT DOCUMENTS

| WO | 2018031623 A1 | 2/2018 |
|---|---|---|
| WO | 2018062957 A1 | 4/2018 |

OTHER PUBLICATIONS

EPO Communication and Search Report dated Dec. 13, 2021 for Patent Application No. 19799215.9, consisting of 8-pages.
3GPP TSG RAN WG1 Meeting NR#3 R1-1716094; Title: Search space design for NR-PDCCH; Agenda Item: 6.3.1.2; Source: NTT Docomo, Inc.; Document for: Discussion and Decision; Date and Location: Sep. 18-21, 2017, Nagoya, Japan, consisting of 11-pages.
3GPP TSG RAN WG1 Meeting #90 R1-1713930; Title: Control resource set configuration for NR-PDCCH; Agenda Item: 6.1.3.1.2.1; Source: NTT Docomo, Inc.; Document for: Discussion and Decision; Date and Location: Aug. 21-25, 2017, Prague, Czechia, consisting of 6-pages.

\* cited by examiner

METHODS, TERMINAL DEVICE AND BASE STATION FOR PHYSICAL DOWNLINK CONTROL CHANNEL MONITORING

CROSS-REFERENCE TO RELATED APPLICATIONS

This application is a Submission Under 35 U.S.C. § 371 for U.S. National Stage Patent Application of International Application No.: PCT/CN2019/086470, filed May 10, 2019 entitled "METHODS, TERMINAL DEVICE AND BASE STATION FOR PHYSICAL DOWNLINK CONTROL CHANNEL MONITORING," which claims priority to International Application No.: PCT/CN2018/086580, filed May 11, 2018, the entireties of both of which are incorporated herein by reference.

TECHNICAL FIELD

Embodiments of the disclosure generally relate to wireless communication, and, more particularly, to methods, a terminal device and a base station for physical downlink control channel (PDCCH) monitoring.

BACKGROUND

This section introduces aspects that may facilitate better understanding of the present disclosure. Accordingly, the statements of this section are to be read in this light and are not to be understood as admissions about what is in the prior art or what is not in the prior art.

Unlicensed spectrum refers to radio frequency bands in which technical rules are specified for both the hardware and deployment of radio systems that are open for shared use by an unlimited number of compliant users. Unlicensed operation will be one key part for new radio (NR). In early phase, the unlicensed spectrum in 5 GHz is the focus in specification and system design. For unlicensed operation, the NR system will be operated in the unlicensed spectrum which is shared by various wireless communication systems. Thus, harmonious spectrum sharing scheme with acceptable complexity for both standardization and system design shall be preferred to ensure different systems can operate well.

For different systems operated in shared unlicensed spectrum (2.4 GHz and 5 GHz), carrier sensing scheme is used. That is, before accessing a channel (or carrier) by a wireless communication system, the wireless communication system shall firstly determine the channel is available via sensing the channel. If the channel is determined as not available, the wireless communication system shall not access the channel. Carrier sensing may also be interchangeably referred to as listen before talk (LBT) hereinafter.

In the LBT scheme for long term evolution-license assisted access (LTE-LAA) system, an evolved node B (eNB) may transmit a transmission including physical downlink shared channel (PDSCH) on a channel on which LAA Scell(s) transmission(s) are performed, after first sensing the channel to be idle during the slot durations of a defer duration $T_d$; and after the counter N is zero in step 4 described below. The Scell refers to a secondary cell provided by the unlicensed spectrum. The counter N is adjusted by sensing the channel for additional slot duration(s) according to the steps below:

1) Set $N=N_{init}$, where $N_{init}$ is a random number uniformly distributed between 0 and $CW_p$, and go to step 4;
2) If N>0 and the eNB chooses to decrement the counter, set N=N−1;
3) Sense the channel for an additional slot duration, and if the additional slot duration is idle, go to step 4; else, go to step 5;
4) If N=0, stop; else, go to step 2;
5) Sense the channel during the slot durations of an additional defer duration $T_d$;
6) If the channel is sensed to be idle during the slot durations of the additional defer duration $T_d$, go to step 2; else, go to step 5.

In addition, if an eNB has not finished a transmission including PDSCH on a channel on which LAA Scell(s) transmission(s) are performed after step 4 in the procedure above, the eNB may transmit a transmission including PDSCH on the channel, after sensing the channel to be idle at least in the slot durations of an additional defer duration $T_d$. If the eNB transmits discovery signal transmission(s) not including PDSCH when N>0 in the procedure above, the eNB shall not decrement N during the slot duration(s) overlapping with discovery signal transmission.

In the procedure described above, the parameter $CW_p$ is the contention window and satisfies $CW_{min,p} \leq CW_p \leq CW_{max,p}$. The defer duration $T_d$ consists of duration 16 us$\leq T_f \leq$16 us+T immediately followed by $m_p$ consecutive slot durations where each slot duration is 9 us$\leq T_{sl} \leq$9 us+$T_s$, and $T_f$ includes an idle slot duration $T_{sl}$ at start of $T_f$. A slot duration $T_{sl}$ is considered to be idle if the eNB senses the channel during the slot duration, and the power detected by the eNB for at least 4 us within the slot duration is less than energy detection threshold $X_{Thresh}$. Otherwise, the slot duration $T_{sl}$ is considered to be busy. The parameters $m_p$, $CW_{min,p}$ and $CW_{max,p}$ are based on channel access priority class p associated with the eNB transmission. The parameter p is determined by the traffic priority class. The high traffic priority class corresponds to a small p, which means short LBT duration is applied.

In order to prevent an eNB from occupying the channel continuously, the eNB shall not continuously transmit on a channel on which the LAA Scell(s) transmission(s) are performed, for a period exceeding $T_{mcot,p}$, where the subscript "mcot" refers to maximum channel occupation time. The following table shows, for different values of p, their corresponding parameter values.

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

For p=3 and p=4 (e.g. video traffic, web browsing or file transfer protocol (FTP) traffic), if the absence of any other technology sharing the carrier can be guaranteed on a long term basis (e.g. by level of regulation), $T_{mcot,p}$=10 ms, otherwise, $T_{mcot,p}$=8 ms.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide improved solutions for PDCCH monitoring.

According to a first aspect of the disclosure, there is provided a method implemented at a terminal device. The method comprises receiving a downlink assignment for assigning PDSCH resource to the terminal device. The method further comprises determining at least part of control resource set (CORESET) resource that overlaps with the assigned PDSCH resource. The method further comprises skipping PDCCH monitoring for the determined at least part of the CORESET resource.

In an embodiment of the disclosure, the method further comprises performing PDSCH reception within the determined at least part of the CORESET resource.

In an embodiment of the disclosure, the terminal device is configured with first CORESET resource for slot level scheduling and second CORESET resource for mini-slot level scheduling. Determining at least part of CORESET resource that overlaps with the assigned PDSCH resource comprises determining the second CORESET resource that overlaps with the assigned PDSCH resource, or determining the first CORESET resource and the second CORESET resource that overlap with the assigned PDSCH resource.

In an embodiment of the disclosure, determining at least part of CORESET resource that overlaps with the assigned PDSCH resource comprises: determining user specific search space in CORESET resource that overlaps with the assigned PDSCH resource.

In an embodiment of the disclosure, the determining and skipping are performed according to pre-configuration in the terminal device.

In an embodiment of the disclosure, the method further comprises: receiving configuration information from one or more of system information, dedicated radio resource control (RRC) signaling, and downlink control information (DCI). The determining and skipping are performed according to the configuration information.

In an embodiment of the disclosure, the configuration information comprises a parameter configured to enable or disable the terminal device with respect to the determining and skipping.

In an embodiment of the disclosure, the parameter takes the form of: a bitmap of multiple bits each corresponding to a CORESET type, or a single bit corresponding to all CORESET types or only one CORESET type.

In an embodiment of the disclosure, the CORESET resource overlaps with the assigned PDSCH resource in time domain or in both time and frequency domain.

According to a second aspect of the disclosure, there is provided a method implemented at a base station. The method comprises determining PDSCH resource that is to be assigned to a terminal device. The method further comprises determining at least part of CORESET resource that overlaps with the determined PDSCH resource. The method further comprises avoiding PDCCH transmission to the terminal device within the determined at least part of the CORESET resource.

In an embodiment of the disclosure, the method further comprises mapping PDSCH to the determined at least part of the CORESET resource.

In an embodiment of the disclosure, the terminal device is configured with first CORESET resource for slot level scheduling and second CORESET resource for mini-slot level scheduling. Determining at least part of CORESET resource that overlaps with the determined PDSCH resource comprises: determining the second CORESET resource that overlaps with the determined PDSCH resource, or determining the first CORESET resource and the second CORESET resource that overlap with the determined PDSCH resource.

In an embodiment of the disclosure, determining at least part of CORESET resource that overlaps with the determined PDSCH resource comprises: determining user specific search space in CORESET resource that overlaps with the determined PDSCH resource.

In an embodiment of the disclosure, the method further comprises: sending, to the terminal device, configuration information in one or more of system information, dedicated RRC signaling, and DCI. The configuration information is configured to enable the terminal device to skip PDCCH monitoring in the determined at least part of the CORESET resource.

In an embodiment of the disclosure, the configuration information comprises a parameter configured to enable or disable the terminal device with respect to the skipping.

In an embodiment of the disclosure, the parameter takes the form of: a bitmap of multiple bits each corresponding to a CORESET type, or a single bit corresponding to all CORESET types or only one CORESET type.

According to a third aspect of the disclosure, there is provided a terminal device. The terminal device comprises at least one processor and at least one memory. The at least one memory contains instructions executable by the at least one processor, whereby the terminal device is operative to receive a downlink assignment for assigning PDSCH resource to the terminal device. The terminal device is further operative to determine at least part of CORESET resource that overlaps with the assigned PDSCH resource. The terminal device is further operative to skip PDCCH monitoring for the determined at least part of the CORESET resource.

In an embodiment of the disclosure, the terminal device is operative to perform the method according to the above first aspect.

According to a fourth aspect of the disclosure, there is provided a base station. The base station comprises at least one processor and at least one memory. The at least one memory contains instructions executable by the at least one processor, whereby the base station is operative to determine PDSCH resource that is to be assigned to a terminal device. The base station is further operative to determine at least part of CORESET resource that overlaps with the determined PDSCH resource. The base station is further operative to avoid PDCCH transmission to the terminal device within the determined at least part of the CORESET resource.

In an embodiment of the disclosure, the base station is operative to perform the method according to the above second aspect.

According to a fifth aspect of the disclosure, there is provided a computer program product. The computer program product comprises instructions which when executed by at least one processor, cause the at least one processor to perform the method according to any of the above first and second aspects.

According to a sixth aspect of the disclosure, there is provided a computer readable storage medium. The computer readable storage medium comprises instructions which when executed by at least one processor, cause the at least one processor to perform the method according to any of the above first and second aspects.

According to a seventh aspect of the disclosure, there is provided a terminal device. The terminal device comprises a reception module for receiving a downlink assignment for assigning PDSCH resource to the terminal device. The terminal device further comprises a determination module for determining at least part of CORESET resource that overlaps with the assigned PDSCH resource. The terminal device further comprises a skipping module for skipping PDCCH monitoring for the determined at least part of the CORESET resource.

According to an eighth aspect of the disclosure, there is provided a base station. The base station comprises a first determination module for determining PDSCH resource that is to be assigned to a terminal device. The base station further comprises a second determination module for determining at least part of CORESET resource that overlaps with the determined PDSCH resource. The base station further comprises an avoiding module for avoiding PDCCH transmission to the terminal device within the determined at least part of the CORESET resource.

According to a ninth aspect of the disclosure, there is provided a method implemented in a communication system including a host computer, a base station and a terminal device. The method comprises, at the host computer, providing user data. The method further comprises, at the host computer, initiating a transmission carrying the user data to the terminal device via a cellular network comprising the base station. The base station determines PDSCH resource that is to be assigned to a terminal device. The base station determines at least part of CORESET resource that overlaps with the determined PDSCH resource. The base station avoids PDCCH transmission to the terminal device within the determined at least part of the CORESET resource.

In an embodiment of the disclosure, the method further comprises, at the base station, transmitting the user data.

In an embodiment of the disclosure, the user data is provided at the host computer by executing a host application. The method further comprises, at the terminal device, executing a client application associated with the host application.

According to a tenth aspect of the disclosure, there is provided a communication system including a host computer comprising processing circuitry configured to provide user data and a communication interface configured to forward the user data to a cellular network for transmission to a terminal device. The cellular network comprises a base station having a radio interface and processing circuitry. The base station's processing circuitry is configured to determine PDSCH resource that is to be assigned to a terminal device. The base station's processing circuitry is configured to determine at least part of CORESET resource that overlaps with the determined PDSCH resource. The base station's processing circuitry is configured to avoid PDCCH transmission to the terminal device within the determined at least part of the CORESET resource.

In an embodiment of the disclosure, the communication system further includes the base station.

In an embodiment of the disclosure, the communication system further includes the terminal device. The terminal device is configured to communicate with the base station.

In an embodiment of the disclosure, the processing circuitry of the host computer is configured to execute a host application, thereby providing the user data. The terminal device comprises processing circuitry configured to execute a client application associated with the host application.

According to an eleventh aspect of the disclosure, there is provided a method implemented in a communication system including a host computer, a base station and a terminal device. The method comprises, at the host computer, providing user data. The method further comprises, at the host computer, initiating a transmission carrying the user data to the terminal device via a cellular network comprising the base station. The terminal device receives a downlink assignment for assigning PDSCH resource to the terminal device. The terminal device determines at least part of CORESET resource that overlaps with the assigned PDSCH resource. The terminal device skips PDCCH monitoring for the determined at least part of the CORESET resource.

In an embodiment of the disclosure, the method further comprises, at the terminal device, receiving the user data from the base station.

According to a twelfth aspect of the disclosure, there is provided a communication system including a host computer comprising processing circuitry configured to provide user data and a communication interface configured to forward user data to a cellular network for transmission to a terminal device. The terminal device comprises a radio interface and processing circuitry. The processing circuitry of the terminal device is configured to receive a downlink assignment for assigning PDSCH resource to the terminal device. The processing circuitry of the terminal device is further configured to determine at least part of CORESET resource that overlaps with the assigned PDSCH resource. The processing circuitry of the terminal device is further configured to skip PDCCH monitoring for the determined at least part of the CORESET resource.

In an embodiment of the disclosure, the communication system further includes the terminal device.

In an embodiment of the disclosure, the cellular network further includes a base station configured to communicate with the terminal device.

In an embodiment of the disclosure, the processing circuitry of the host computer is configured to execute a host application, thereby providing the user data. The processing circuitry of the terminal device is configured to execute a client application associated with the host application.

According to some embodiment(s) of the disclosure, the peak signaling processing load in the terminal device can be reduced and the requirement for the signal processing capability of the terminal device can be decreased at no cost.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
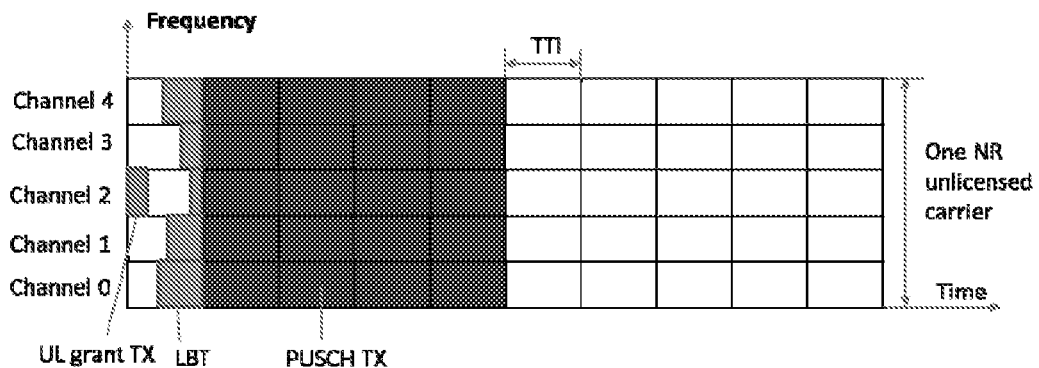
FIG. 1 shows uplink data transmission in NR unlicensed carrier.

Currently, the discussion for LBT for NR has been started in 3rd generation partnership project (3GPP). The current LBT for WiFi and LAA are defined according to the spectrum regulation policies. It is expected that the unlicensed operation of NR shall be subject to the similar rule for LBT in order to comply with the regulatory policy and coexist with WiFi and LAA. According to this expectation, scheduled uplink (UL) data transmission in NR unlicensed carrier may be as shown in FIG. 1. In this example, the unlicensed carrier has a bandwidth of 100 MHz in 5 GHz band and comprises 5 channels each having a 20 MHz bandwidth. When receiving a scheduling grant to schedule data transmission over the entire carrier, the user equipment (UE) performs LBT for each channel respectively and the UL data transmission is performed over the channels which are determined to be available. In FIG. 1, all 5 channels are determined to be available based on LBT procedure.

Figure 2:
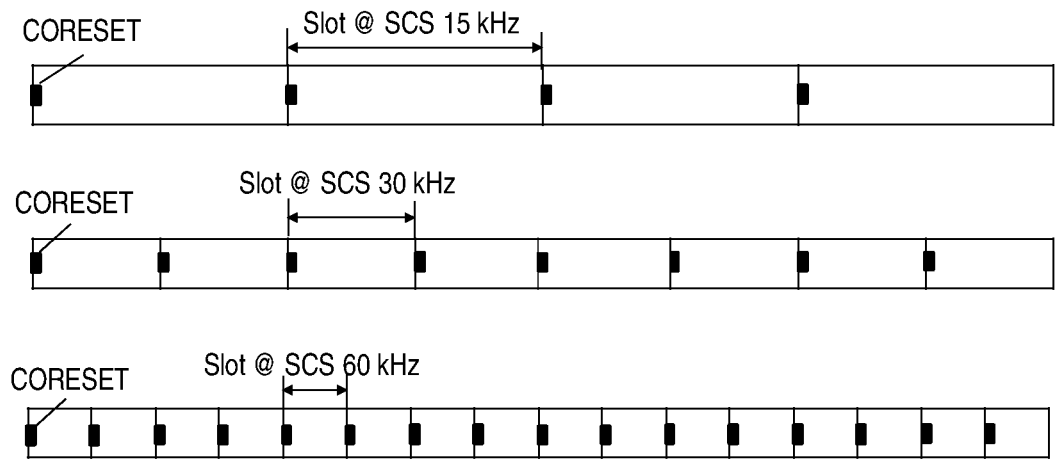
FIG. 2 shows CORESET for slot based scheduling for different numerologies.
Figure 3:
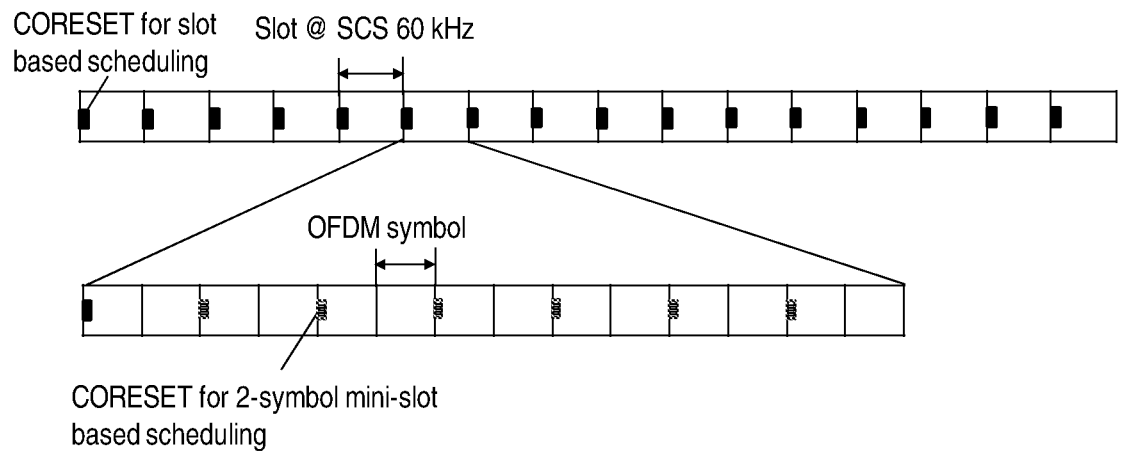
FIG. 3 shows CORESET for 2-symbol mini-slot based scheduling.

Unlike LTE, NR supports multiple numerologies and mini-slot operation. FIG. 2 shows CORESET configuration example for slot based scheduling for different numerologies. As shown, as the subcarrier spacing (SCS) increases, the length of a slot decreases compared to LTE. Since there is one CORESET for each slot, during a slot corresponding to SCS 15 kHz, the UE should monitor 1, 2 and 4 CORESETs respectively for SCS 15, 30 and 60 kHz for slot based scheduling. In principle, NR can start physical UL shared channel (PUSCH) or physical uplink control channel (PUCCH) transmission from any symbol (e.g., orthogonal frequency division multiplexing (OFDM) symbol) within a slot. This means that the UE may be configured with mini-slot based scheduling. For example, FIG. 3 shows CORESET for 2-symbol mini-slot based scheduling for SCS 60 kHz. As shown, the UE should monitor 4 CORESETs for slot-based scheduling and 24 CORESETs for 2-symbol mini-slot based scheduling within one millisecond. There could be more CORESETs within one millisecond if a base station (e.g., a gNB) enables data transmission from any symbol. By using numerology with large subcarrier spacing and/or mini-slot operation, an NR UE can have better performance to contend for an unlicensed channel based on LBT procedure due to the smaller time granularity for NR.

PDCCH monitoring may generate considerable computation complexity. For instance, within one millisecond, the UE needs to monitor 4 CORESETs for slot based scheduling and 24 CORESETs for 2-symbol mini-slot based scheduling with SCS 60 kHz in FIG. 3 compared to a single CORESET for slot based scheduling with SCS 15 kHz. The computation complexity can be endurable if there is no parallel signal processing for PDSCH decoding. However, when there is parallel PDSCH reception, the PDCCH monitoring takes too much signaling processing resource, which would increase the cost for the UE's signal processor and reduce the UE's battery life.

The present disclosure proposes a series of solutions for PDCCH monitoring. These solutions may be applied to a wireless communication system including a terminal device and a base station. The terminal device can communicate through a radio access communication link with the base station. The base station can provide radio access communication links to UEs that are within its communication service cell. The base station may be, for example, a gNB in NR. Note that the communications may be performed between the terminal device and the base station according to any suitable communication standards and protocols. The terminal device may also be referred to as, for example, user equipment (UE), mobile station, mobile unit, subscriber station, access terminal, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Figure 4:
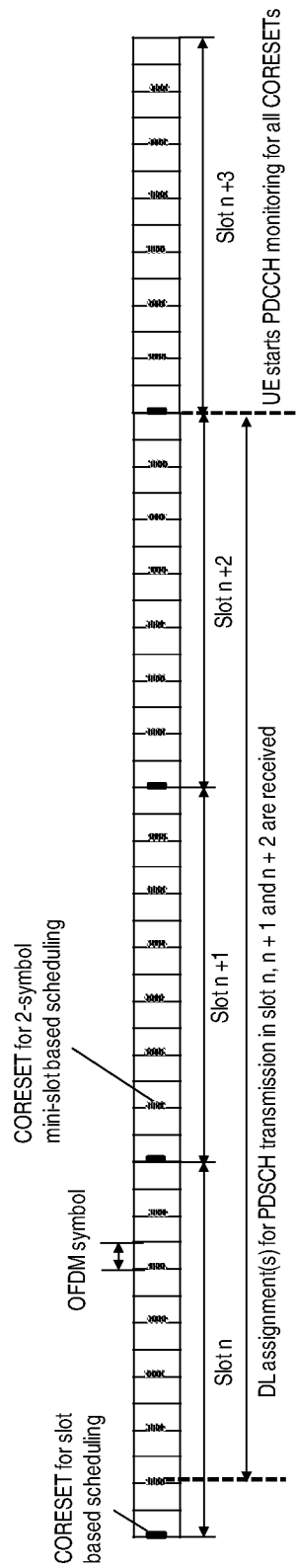
FIG. 4 is a diagram illustrating the first embodiment of the disclosure.

Hereinafter, the solutions will be described in detail with reference to FIGS. 4-13. FIG. 4 is a diagram illustrating the first embodiment of the disclosure. In this embodiment, a UE may be preconfigured (or predefined) to skip PDCCH monitoring in some CORESET(s) when PDSCH resource for an ongoing PDSCH reception overlaps with the resource of the CORESET(s) in time domain or in both time and frequency domain. Correspondingly, a base station (e.g., a gNB) may be configured to avoid sending PDCCH to the UE using the CORESET(s) for which the PDCCH monitoring is skipped by the UE. In this way, the peak signaling processing load in the UE can be reduced and the requirement for the signal processing capability of the UE can be decreased at no cost. Note that when there is no ongoing PDSCH reception, the UE may monitor all configured CORESETs to enable good scheduling granularity in time domain to improve the performance for resource contention.

As an exemplary case, the UE is configured with CORESET A for slot level scheduling and CORESET B for mini-slot level scheduling. In this case, as a first option, the UE may be preconfigured to skip the PDCCH monitoring in CORESET B when the PDSCH reception overlaps with CORESET B. As a second option, the UE may be preconfigured to skip the PDCCH monitoring in both CORESET A and CORESET B when the PDSCH reception overlaps with CORESET A and/or CORESET B.

In the example shown in FIG. 4, the UE is configured with CORESET for slot based scheduling and CORESET for 2-symbol mini-slot based scheduling as shown in FIG. 3. At the second symbol of slot n, the UE performs PDCCH monitoring in the first CORESET for 2-symbol mini-slot based scheduling and obtains a downlink assignment for PDSCH transmission in slots n, n+1 and n+2. Thus, the remaining 17 CORESETs for 2-symbol mini-slot based scheduling in slots n, n+1 and n+2, as well as 2 CORESETs for slot based scheduling in slots n+1 and n+2 overlap with the assigned PDSCH resource. As the first option, the UE may skip the PDCCH monitoring in the remaining 17 CORESETs for 2-symbol mini-slot based scheduling in slots n, n+1 and n+2. As the second option, the UE may skip the PDCCH monitoring in the remaining 19 CORESETs in slots n, n+1 and n+2. From the CORESET for slot based scheduling in slot n+3, the UE starts PDCCH monitoring for all CORESETs.

In the second embodiment, for CORESET within which common search space is configured, the UE may be preconfigured to keep monitoring at least the common search space and skip monitoring the user specific search space. In this way, the common control signal (such as system information) can be avoided from being missed.

In the third embodiment, when a UE determines that the PDCCH monitoring for a CORESET is skipped, the UE may assume that PDSCH are not punctured to reserve the resource for the CORESET upon PDSCH reception. That is, the UE may perform PDSCH reception within the resource of the skipped CORESET. Correspondingly, a base station (e.g., a gNB) may be configured to map the PDSCH in the CORESET region if the base station determines that the PDCCH monitoring for the CORESET is skipped by the UE.

In the fourth embodiment, the parameter(s) to enable or disable a UE with respect to skipping PDCCH monitoring for a CORESET may be configured via system information (also referred to as common RRC signaling) or dedicated RRC signaling.

In the fifth embodiment, an indicator may be defined in DCI to indicate whether the scheduled UE should skip the PDCCH monitoring when the scheduled PDSCH is being transmitted. The indicator may be a bitmap (having multiple bits each corresponding to one CORESET type) or single bit (corresponding to all CORESET types or only one CORESET type). As an example, CORESET type 1 may be for slot level scheduling and CORESET type 2 may be for 2-symbol mini-slot based scheduling in FIG. 4. When a bit in the indicator takes zero value, it may mean the UE can skip the PDCCH monitoring for the corresponding CORESET(s) and can assume PDSCH is mapped to the resource for the CORESET(s) at PDSCH reception.

Although the above embodiments are described in the context of unlicensed operation, those skilled in the art can understand that the principle of the present disclosure may also be applicable for licensed operation with high CORESET density.

Figure 5:
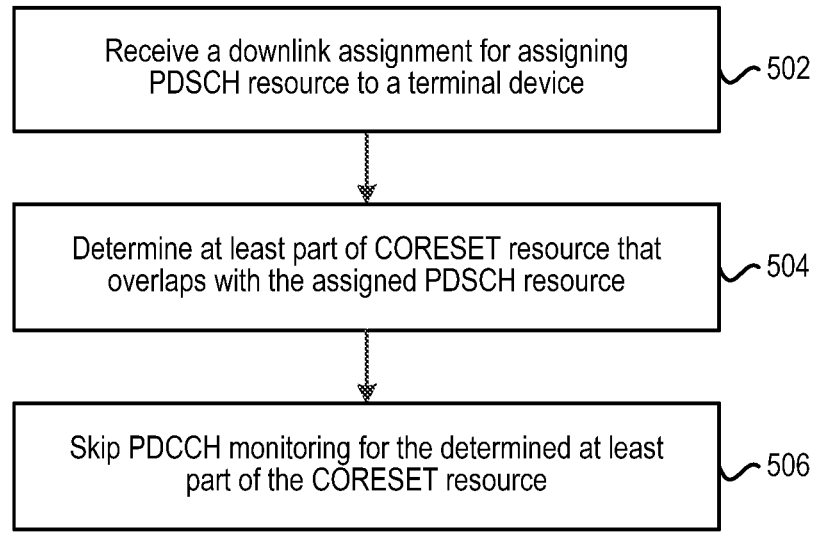
FIG. 5 is a flowchart illustrating a method implemented at a terminal device according to an embodiment of the disclosure.

FIG. 5 is a flowchart illustrating a method implemented at a terminal device according to an embodiment of the disclosure. At block 502, the terminal device receives a downlink assignment for assigning PDSCH resource to the terminal device. The downlink assignment may be received by performing PDCCH monitoring in CORESET. At block 504, the terminal device determines at least part of CORESET resource that overlaps with the assigned PDSCH resource. The CORESET resource may overlap with the assigned PDSCH resource in time domain or in both time and frequency domain. For example, the determined CORESET resource that overlaps with the assigned PDSCH resource may be CORESET occasions in time domain. The at least part may be determined according to pre-configuration in the terminal device.

Figure 6:
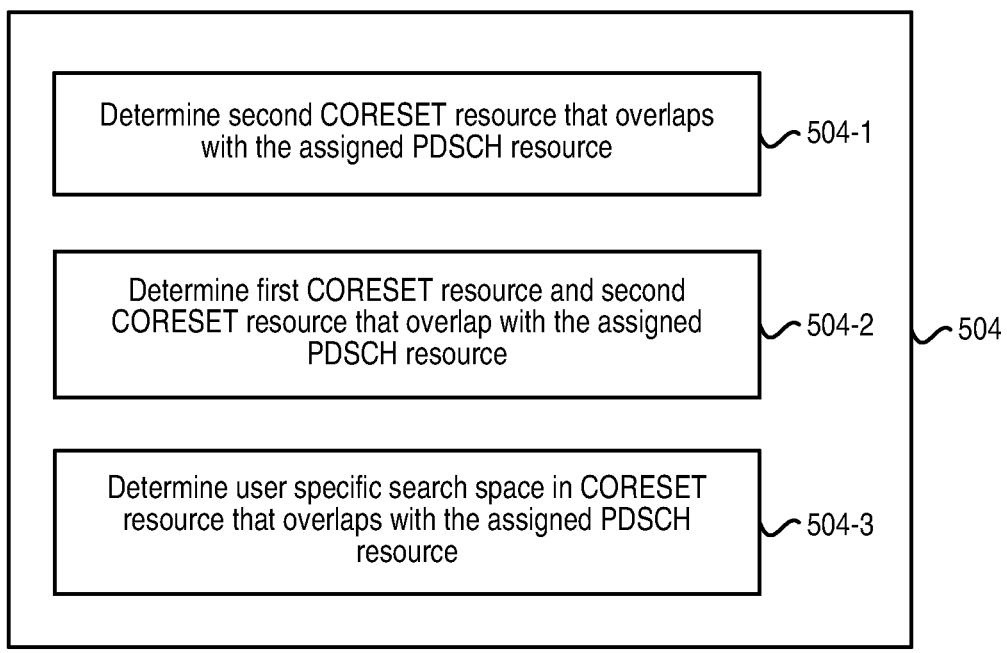
FIG. 6 is a flowchart for explaining the method of FIG. 5.

For example, block 504 may be implemented as any one of blocks 504-1, 504-2 and 504-3 shown in FIG. 6 or any combination thereof. At block 504-1, when the terminal device is configured with first CORESET resource for slot level scheduling and second CORESET resource for mini-slot level scheduling, the terminal device may determine the second CORESET resource that overlaps with the assigned PDSCH resource. At block 504-2, when the terminal device is configured with first CORESET resource for slot level scheduling and second CORESET resource for mini-slot level scheduling, the terminal device may determine the first CORESET resource and the second CORESET resource that overlap with the assigned PDSCH resource. Blocks 504-1 and 504-2 correspond to the first embodiment described above. At block 504-3, the terminal device may determine user specific search space in CORESET resource that overlaps with the assigned PDSCH resource. Block 504-3 corresponds to the second embodiment described above. At block 506, the terminal device skips PDCCH monitoring for the determined at least part of the CORESET resource.

Figure 7:
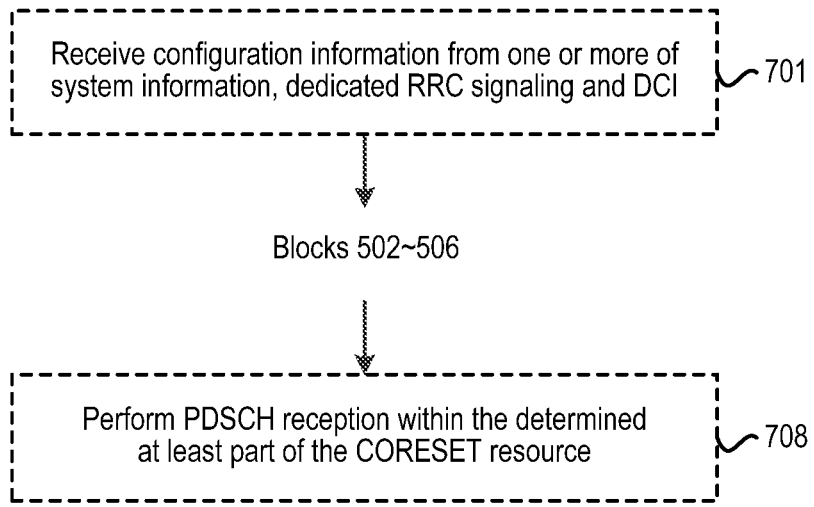
FIG. 7 is a flowchart illustrating a method implemented at a terminal device according to another embodiment of the disclosure.

FIG. 7 is a flowchart illustrating a method implemented at a terminal device according to another embodiment of the disclosure. As shown, the method of FIG. 7 comprises blocks 701, 502-506 and 708. Each of blocks 701 and 708 may be an optional block. At block 701, the terminal device receives configuration information from one or more of system information, dedicated RRC signaling, and DCI. For example, the configuration information may comprise a parameter configured to enable or disable the terminal device with respect to the determining and skipping. The parameter may take the form of: a bitmap of multiple bits each corresponding to a CORESET type, or a single bit corresponding to all CORESET types or only one CORESET type. For example, when a bit in the parameter takes zero value, it may indicate the terminal device to skip the determined at least part of the CORESET resource. Block 701 corresponds to the fourth and fifth embodiments described above.

At block 502, the terminal device receives a downlink assignment for assigning PDSCH resource to the terminal device. At block 504, the terminal device determines at least part of CORESET resource that overlaps with the assigned PDSCH resource. The determination may be performed according to the configuration information received at block 701. At block 506, the terminal device skips PDCCH monitoring for the determined at least part of the CORESET resource. At block 708, the terminal device performs PDSCH reception within the determined at least part of the CORESET resource. Block 708 corresponds to the third embodiment described above.

Figure 8:
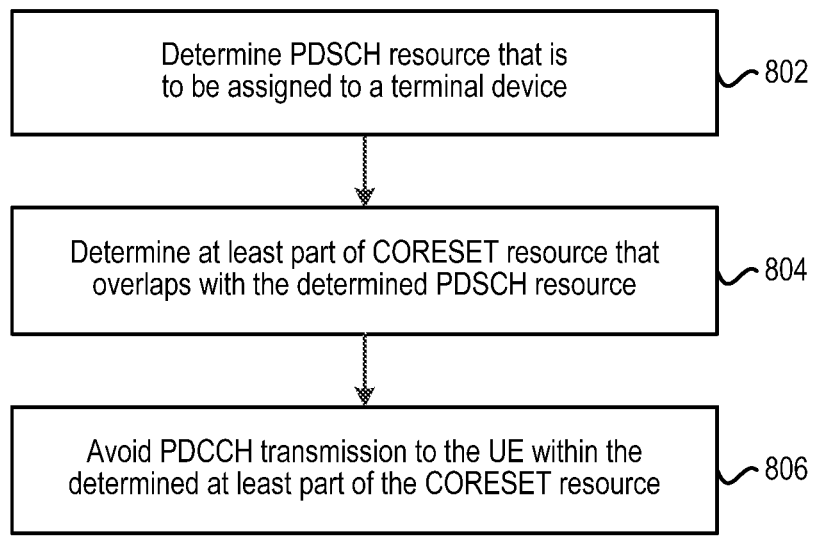
FIG. 8 is a flowchart illustrating a method implemented at a base station according to an embodiment of the disclosure.

FIG. 8 is a flowchart illustrating a method implemented at a base station according to an embodiment of the disclosure. For example, the base station may be a gNB in NR. At block 802, the base station determines PDSCH resource that is to be assigned to a terminal device. Block 802 may be performed by using various resource scheduling technologies currently known or developed in the future. At block 804, the base station determines at least part of CORESET resource that overlaps with the determined PDSCH resource. The CORESET resource may overlap with the determined PDSCH resource in time domain or in both time and frequency domain. For example, the determined CORESET resource that overlaps with the determined PDSCH resource may be CORESET occasions in time domain.

Figure 9:
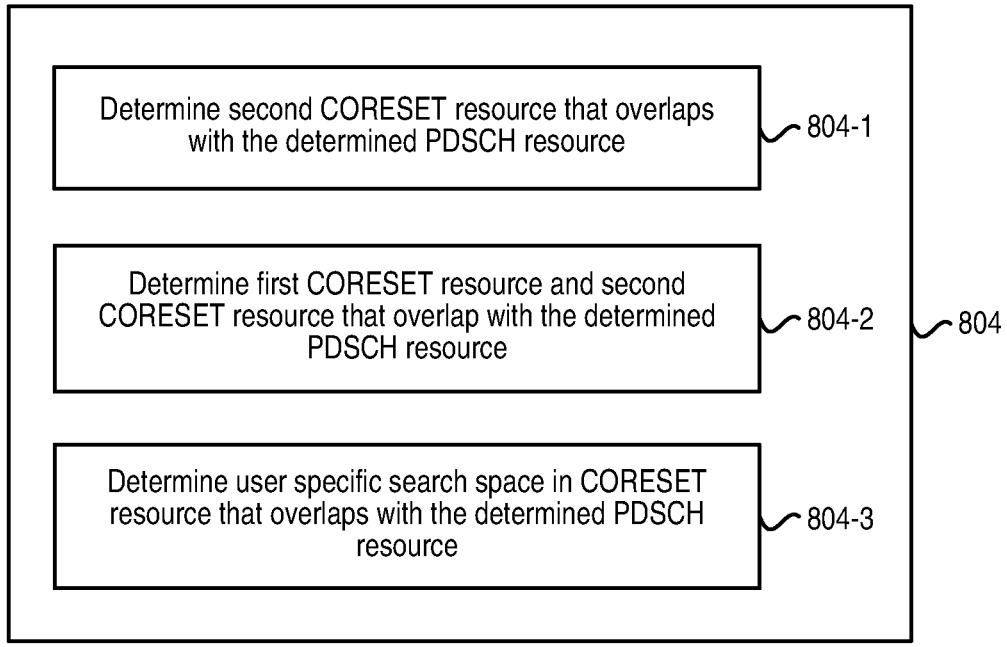
FIG. 9 is a flowchart for explaining the method of FIG. 8.

For example, block 804 may be implemented as any one of blocks 804-1, 804-2 and 804-3 shown in FIG. 9 or any combination thereof. At block 804-1, when the terminal device is configured with first CORESET resource for slot level scheduling and second CORESET resource for mini-slot level scheduling, the base station may determine the second CORESET resource that overlaps with the determined PDSCH resource. At block 804-2, when the terminal device is configured with first CORESET resource for slot level scheduling and second CORESET resource for mini-slot level scheduling, the base station may determine the first CORESET resource and the second CORESET resource that overlap with the determined PDSCH resource. Blocks 804-1 and 804-2 correspond to the first embodiment described above. At block 804-3, the base station may determine user specific search space in CORESET resource that overlaps with the determined PDSCH resource. Block 804-3 corresponds to the second embodiment described above. At block 806, the base station avoids PDCCH transmission to the terminal device within the determined at least part of the CORESET resource.

Figure 10:
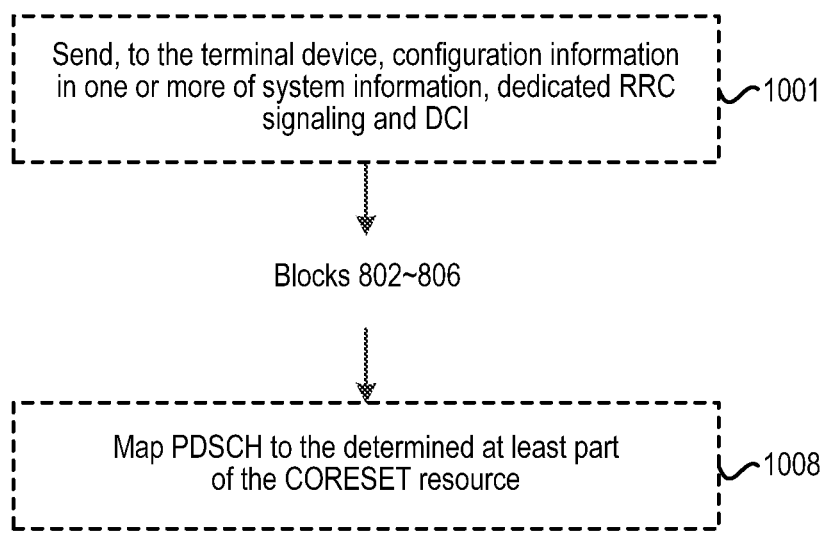
FIG. 10 is a flowchart illustrating a method implemented at a base station according to another embodiment of the disclosure.

FIG. 10 is a flowchart illustrating a method implemented at a base station according to another embodiment of the disclosure. As shown, the method of FIG. 10 comprises blocks 1001, 802-806 and 1008. Each of blocks 1001 and 1008 may be an optional block. At block 1001, the base station sends to the terminal device configuration information in one or more of system information, dedicated RRC signaling, and DCI. The configuration information is configured to enable the terminal device to skip PDCCH monitoring in the determined at least part of the CORESET resource. For example, the configuration information may comprise a parameter configured to enable or disable the terminal device with respect to the skipping. The parameter may take the form of: a bitmap of multiple bits each corresponding to a CORESET type, or a single bit corresponding to all CORESET types or only one CORESET type. For example, when a bit in the parameter takes zero value, it may indicate the terminal device to skip the determined at least part of the CORESET resource. Block 1001 corresponds to the fourth and fifth embodiments described above.

At block 802, the base station determines PDSCH resource that is to be assigned to a terminal device. At block 804, the base station determines at least part of CORESET resource that overlaps with the determined PDSCH resource. The determination may be performed according to the configuration information sent at block 1001. At block 806, the base station avoids PDCCH transmission to the terminal device within the determined at least part of the CORESET resource. At block 1008, the base station maps PDSCH to the determined at least part of the CORESET resource. Block 1008 corresponds to the third embodiment described above. It should be noted that two blocks shown in succession may, in fact, be executed substantially concurrently, or the blocks may sometimes be executed in the reverse order, depending upon the functionality involved.

Figure 11:
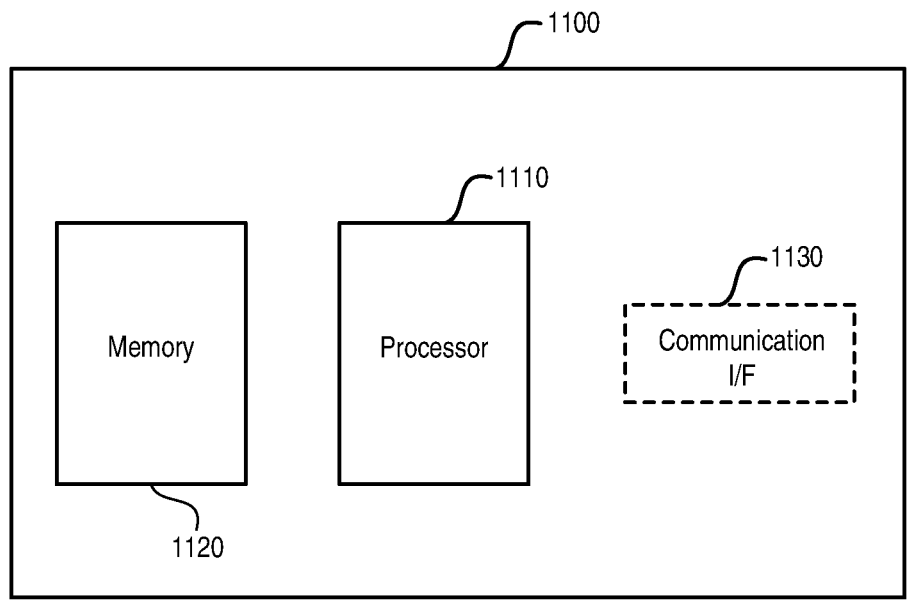
FIG. 11 is a block diagram showing an apparatus suitable for use in practicing some embodiments of the disclosure.

FIG. 11 is a block diagram showing an apparatus suitable for use in practicing some embodiments of the disclosure. For example, any one of the terminal device and the base station described above may be implemented through the apparatus 1100. As shown, the apparatus 1100 may include a processor 1110, a memory 1120 that stores a program, and optionally a communication interface 1130 for communicating data with other external devices through wired and/or wireless communication.

The program includes program instructions that, when executed by the processor 1110, enable the apparatus 1100 to operate in accordance with the embodiments of the present disclosure, as discussed above. That is, the embodiments of the present disclosure may be implemented at least in part by computer software executable by the processor 1110, or by hardware, or by a combination of software and hardware.

The memory 1120 may be of any type suitable to the local technical environment and may be implemented using any suitable data storage technology, such as semiconductor based memory devices, flash memories, magnetic memory devices and systems, optical memory devices and systems, fixed memories and removable memories. The processor 1110 may be of any type suitable to the local technical environment, and may include one or more of general purpose computers, special purpose computers, microprocessors, digital signal processors (DSPs) and processors based on multi-core processor architectures, as non-limiting examples.

Figure 12:
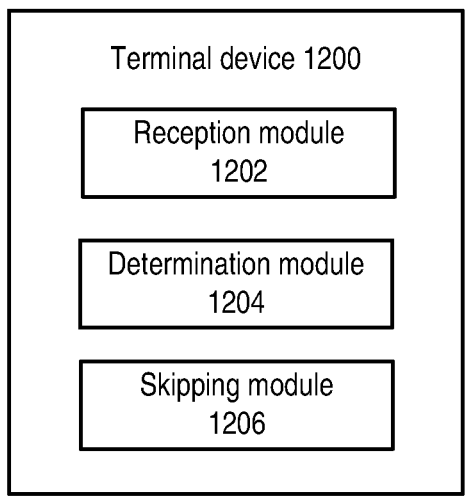
FIG. 12 is a block diagram showing a terminal device according to an embodiment of the disclosure.

FIG. 12 is a block diagram showing a terminal device according to an embodiment of the disclosure. As shown, the terminal device 1200 comprises a reception module 1202, a determination module 1204 and a skipping module 1206. The reception module 1202 may be configured to receive a downlink assignment for assigning PDSCH resource to the terminal device (block 502). The determination module 1204 may be configured to determine at least part of CORESET resource that overlaps with the assigned PDSCH resource (block 504). The skipping module 1206 may be configured to skip PDCCH monitoring for the determined at least part of the CORESET resource (block 506).

Optionally, the reception module 1202 may be configured to receive configuration information from one or more of system information, dedicated RRC signaling, and DCI. Optionally, the reception module 1202 may be configured to perform PDSCH reception within the determined at least part of the CORESET resource.

Figure 13:
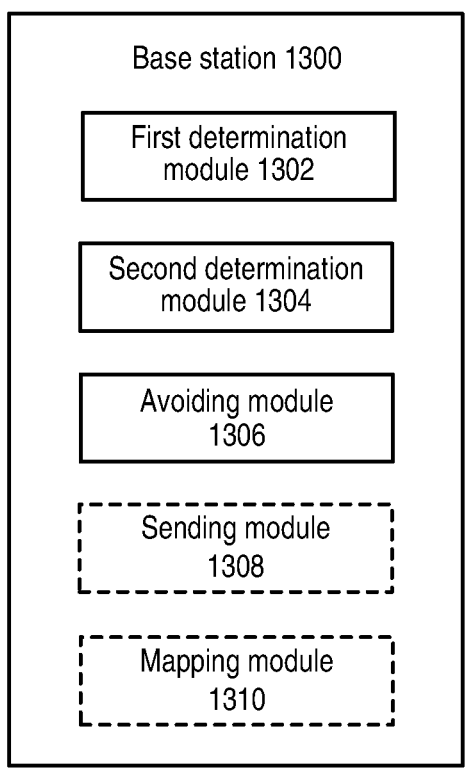
FIG. 13 is a block diagram showing a base station according to an embodiment of the disclosure.

FIG. 13 is a block diagram showing a base station according to an embodiment of the disclosure. As shown, the base station 1300 comprises a first determination module 1302, a second determination module 1304 and an avoiding module 1306. The first determination module 1302 may be configured to determine PDSCH resource that is to be assigned to a terminal device (block 802). The second determination module 1304 may be configured to determine at least part of CORESET resource that overlaps with the determined PDSCH resource (block 804). The avoiding module 1306 may be configured to avoid PDCCH transmission to the terminal device within the determined at least part of the CORESET resource (block 806).

Optionally, the sending module 1306 may be configured to send to the terminal device configuration information in one or more of system information, dedicated RRC signaling, and DCI. The configuration information is configured to enable the terminal device to skip PDCCH monitoring in the determined at least part of the CORESET resource. Optionally, the base station 1300 may further comprise a mapping module 1306. The mapping module 1305 may be configured to map PDSCH to the determined at least part of the CORESET resource.

Figure 14:
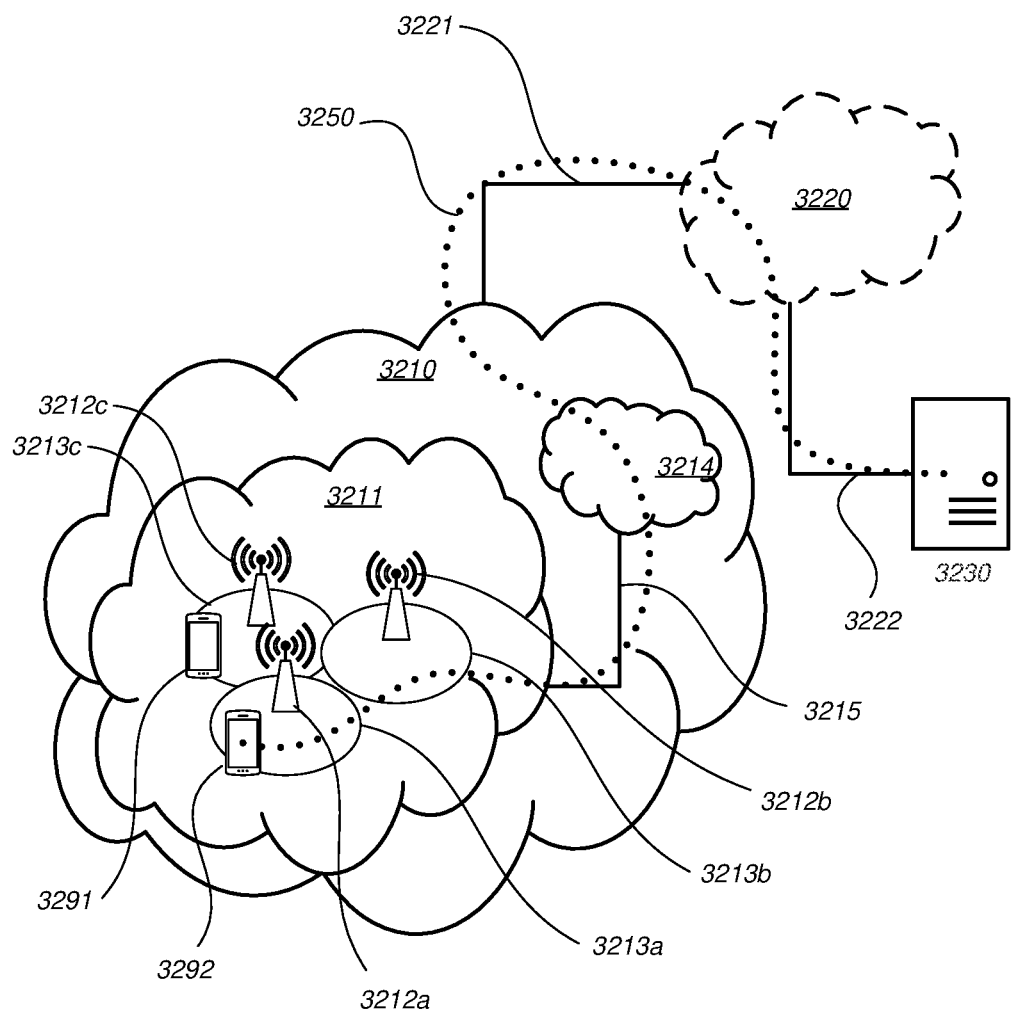
FIG. 14 is a diagram showing a telecommunication network connected via an intermediate network to a host computer in accordance with some embodiments.

With reference to FIG. 14, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NB s, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 14 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 15. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 15) served by base station 3320. Communication interface 3326 may be configured to facilitate connection 3360 to host computer 3310. Connection 3360 may be direct or it may pass through a core network (not shown in FIG. 15) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 15:
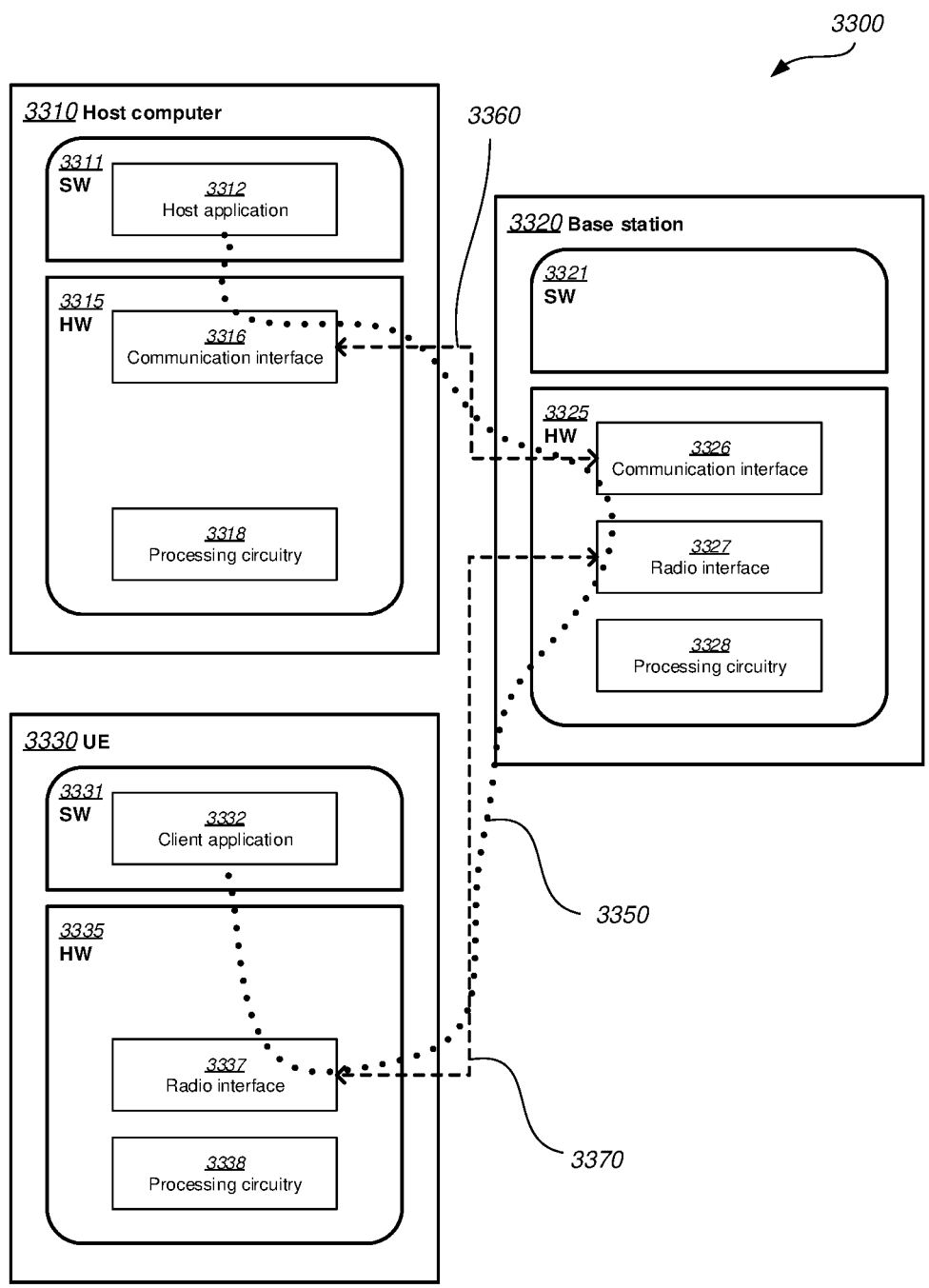
FIG. 15 is a diagram showing a host computer communicating via a base station with a user equipment in accordance with some embodiments.

It is noted that host computer 3310, base station 3320 and UE 3330 illustrated in FIG. 15 may be similar or identical to host computer 3230, one of base stations 3212*a*, 3212*b*, 3212*c* and one of UEs 3291, 3292 of FIG. 14, respectively. This is to say, the inner workings of these entities may be as shown in FIG. 15 and independently, the surrounding network topology may be that of FIG. 14.

In FIG. 15, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 16:
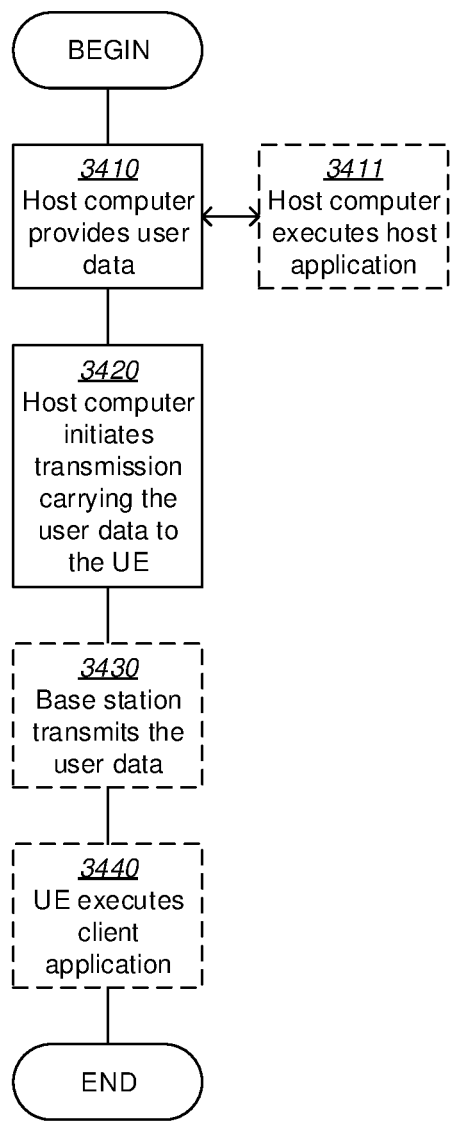
FIG. 16 is a flowchart illustrating a method implemented in a communication system in accordance with some embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 17:
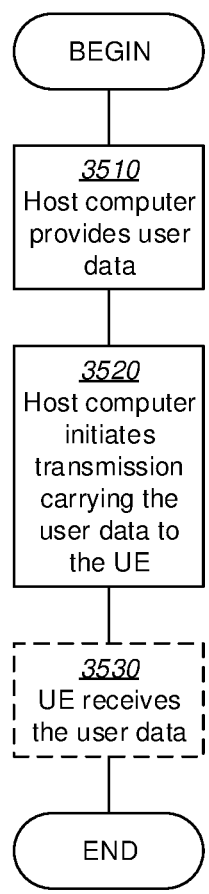
FIG. 17 is a flowchart illustrating a methods implemented in a communication system in accordance with some embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 18:
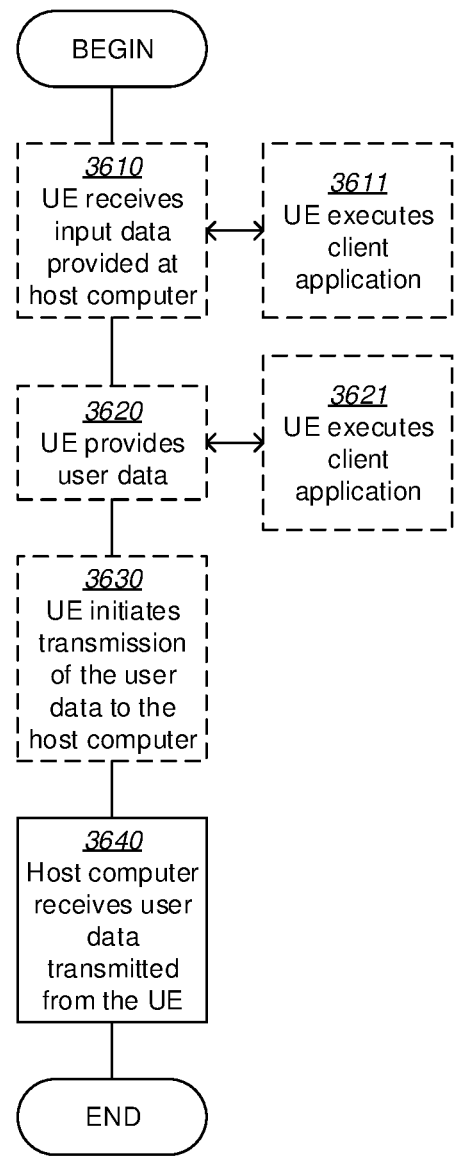
FIG. 18 is a flowchart illustrating a method implemented in a communication system in accordance with some embodiments.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 19:
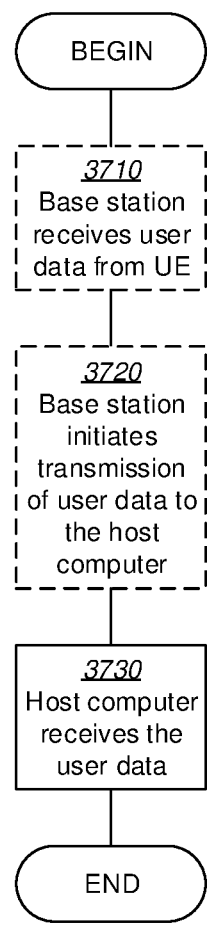
FIG. 19 is a flowchart illustrating a method implemented in a communication system in accordance with some embodiments.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a terminal device, the terminal device being configured with a first CORESET resource for slot level scheduling and a second CORESET resource for mini-slot level scheduling, the method comprising:
   receiving a downlink assignment for assigning physical downlink shared channel, PDSCH, resource to the terminal device;
   determining at least part of control resource set, CORESET, resource that overlaps with the assigned PDSCH resource, determining at least part of CORESET resource that overlaps with the assigned PDSCH resource comprises one of:
      determining the second CORESET resource that overlaps with the assigned PDSCH resource; and
      determining the first CORESET resource and the second CORESET resource that overlap with the assigned PDSCH resource;
   skipping physical downlink control channel, PDCCH, monitoring for the determined at least part of the CORESET resource;
   receiving configuration information from one or more of system information, dedicated radio resource control, RRC, signaling, and downlink control information, DCI, the configuration information comprising a parameter configured to one of enable and disable the terminal device with respect to the determining and skipping; and
   the determining and skipping being performed according to the configuration information.

2. The method according to claim 1, further comprising: performing PDSCH reception within the determined at least part of the CORESET resource.

3. The method according to claim 1, wherein determining at least part of CORESET resource that overlaps with the assigned PDSCH resource comprises:
   determining user specific search space in CORESET resource that overlaps with the assigned PDSCH resource.

4. The method according to claim 1, wherein the determining and skipping are performed according to pre-configuration in the terminal device.

5. The method according to claim 1, wherein the parameter takes the form of one of:

a bitmap of multiple bits each corresponding to a CORESET type; and
a single bit corresponding to one of all CORESET types and only one CORESET type.

6. The method according to claim 1, wherein the CORESET resource overlaps with the assigned PDSCH resource in one of a time domain and in both the time and a frequency domain.

7. A method implemented at a base station, the method comprising:
determining physical downlink shared channel, PDSCH, resource that is to be assigned to a terminal device, the terminal device being configured with a first CORESET resource for slot level scheduling and a second CORESET resource for mini-slot level scheduling;
determining at least part of control resource set, CORESET, resource that overlaps with the determined PDSCH resource, determining at least part of CORESET resource that overlaps with the determined PDSCH resource comprising one of:
determining the second CORESET resource that overlaps with the determined PDSCH resource; and
determining the first CORESET resource and the second CORESET resource that overlap with the determined PDSCH resource;
avoiding physical downlink control channel, PDCCH, transmission to the terminal device within the determined at least part of the CORESET resource;
sending, to the terminal device, configuration information in one or more of system information, dedicated radio resource control, RRC, signaling, and downlink control information, DCI;
the configuration information being configured to enable the terminal device to skip PDCCH monitoring in the determined at least part of the CORESET resource; and
the configuration information comprises a parameter configured to one of enable and disable the terminal device with respect to the skipping.

8. The method according to claim 7, further comprising:
mapping PDSCH to the determined at least part of the CORESET resource.

9. The method according to claim 7, wherein determining at least part of CORESET resource that overlaps with the determined PDSCH resource comprises:
determining user specific search space in CORESET resource that overlaps with the determined PDSCH resource.

10. The method according to claim 7, wherein the parameter takes the form of one of:
a bitmap of multiple bits each corresponding to a CORESET type; and
a single bit corresponding to one of all CORESET types and only one CORESET type.

11. The method according to claim 7, wherein the CORESET resource overlaps with the determined PDSCH resource in one of a time domain and in both the time and a frequency domain.

12. A terminal device, the terminal device being configured with a first CORESET resource for slot level scheduling and a second CORESET resource for mini-slot level scheduling, the terminal device comprising:
at least one processor; and
at least one memory, the at least one memory containing instructions executable by the at least one processor, the terminal device is configured to:
receive a downlink assignment for assigning physical downlink shared channel, PDSCH, resource to the terminal device;
determine at least part of control resource set, CORESET, resource that overlaps with the assigned PDSCH resource, determining at least part of CORESET resource that overlaps with the assigned PDSCH resource comprising one of:
determining the second CORESET resource that overlaps with the assigned PDSCH resource; and
determining the first CORESET resource and the second CORESET resource that overlap with the assigned PDSCH resource;
skip physical downlink control channel, PDCCH, monitoring for the determined at least part of the CORESET resource;
receive configuration information from one or more of system information, dedicated radio resource control, RRC, signaling, and downlink control information, DCI, the configuration information comprising a parameter configured to one of enable and disable the terminal device with respect to the determining and skipping; and
the determining and skipping being performed according to the configuration information.

13. A base station comprising:
at least one processor; and
at least one memory, the at least one memory containing instructions executable by the at least one processor, the base station being configured to:
determine physical downlink shared channel, PDSCH, resource that is to be assigned to a terminal device, the terminal device being configured with a first CORESET resource for slot level scheduling and a second CORESET resource for mini-slot level scheduling;
determine at least part of control resource set, CORESET, resource that overlaps with the determined PDSCH resource, determining at least part of CORESET resource that overlaps with the determined PDSCH resource comprises one of:
determining the second CORESET resource that overlaps with the determined PDSCH resource; and
determining the first CORESET resource and the second CORESET resource that overlap with the determined PDSCH resource;
avoid physical downlink control channel, PDCCH, transmission to the terminal device within the determined at least part of the CORESET resource;
send, to the terminal device, configuration information in one or more of system information, dedicated radio resource control, RRC, signaling, and downlink control information, DCI;
the configuration information is configured to enable the terminal device to skip PDCCH monitoring in the determined at least part of the CORESET resource; and
the configuration information comprises a parameter configured to one of enable and disable the terminal device with respect to the skipping.

* * * * *